(12) United States Patent
Duignan

(10) Patent No.: US 7,264,099 B2
(45) Date of Patent: Sep. 4, 2007

(54) MOTORCYCLE TRANSMISSION SHIFTING MECHANISM

(76) Inventor: Thomas Duignan, 45 Jefferson St., New Hyde Park, NY (US) 11040

( * ) Notice: Subject to any disclaimer, the term of this patent is extended or adjusted under 35 U.S.C. 154(b) by 111 days.

(21) Appl. No.: 10/518,290

(22) PCT Filed: Jul. 16, 2003

(86) PCT No.: PCT/US03/22147

§ 371 (c)(1),
(2), (4) Date: Dec. 15, 2004

(87) PCT Pub. No.: WO2004/010025

PCT Pub. Date: Jan. 29, 2004

(65) Prior Publication Data

US 2005/0230209 A1    Oct. 20, 2005

Related U.S. Application Data

(60) Provisional application No. 60/397,390, filed on Jul. 20, 2002.

(51) Int. Cl.
*F16D 11/06*    (2006.01)

(52) U.S. Cl. .................. 192/43.1; 74/473.16; 180/230; 192/99 S

(58) Field of Classification Search ..................... None
See application file for complete search history.

(56) References Cited

U.S. PATENT DOCUMENTS

| | | | |
|---|---|---|---|
| 2,094,163 A * | 9/1937 | Weber | 74/481 |
| 4,510,820 A * | 4/1985 | Tsuboi | 74/473.16 |
| 5,413,200 A | 5/1995 | Hirata | |
| 5,495,928 A | 3/1996 | Sando | |
| 5,661,999 A * | 9/1997 | Carone | 74/473.16 |
| 6,308,797 B1 | 10/2001 | Hacker et al. | |

OTHER PUBLICATIONS

International Search Report for PCT/US03/22147; Feb. 19, 2004; form PCT/ISA/210; pp. 2.

* cited by examiner

*Primary Examiner*—Saul Rodriguez
(74) *Attorney, Agent, or Firm*—The Farrell Law Firm

(57) ABSTRACT

A motorcycle transmission shifting mechanism includes a foot-operated gearshift assembly provided with a pedal and cam subassembly, displaceable relative to one another to establish a desired speed-ratio position, and a hand-operated clutch release mechanism operative to release a clutch for shifting through multiple speed-ratio positions.

20 Claims, 7 Drawing Sheets

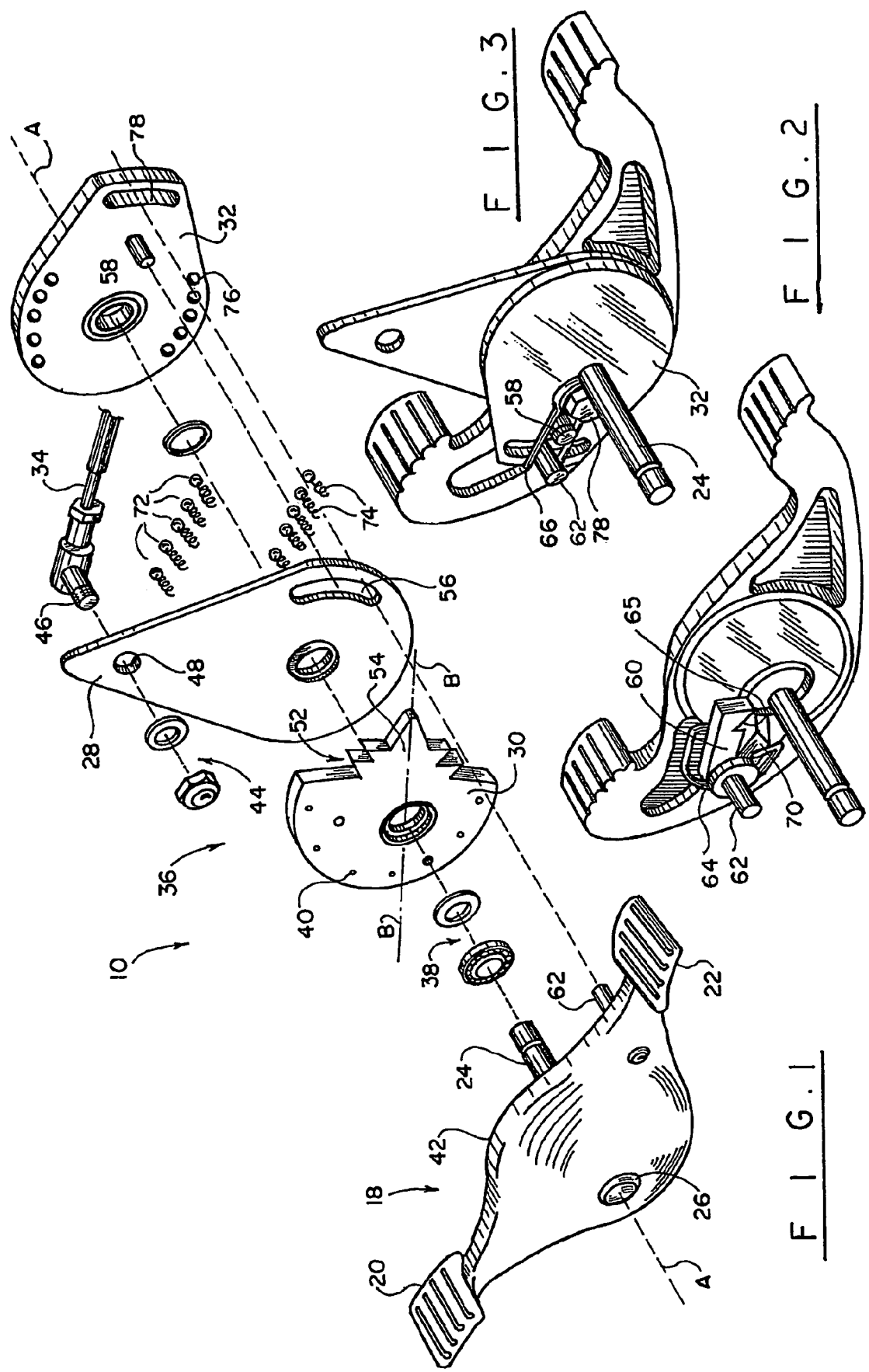

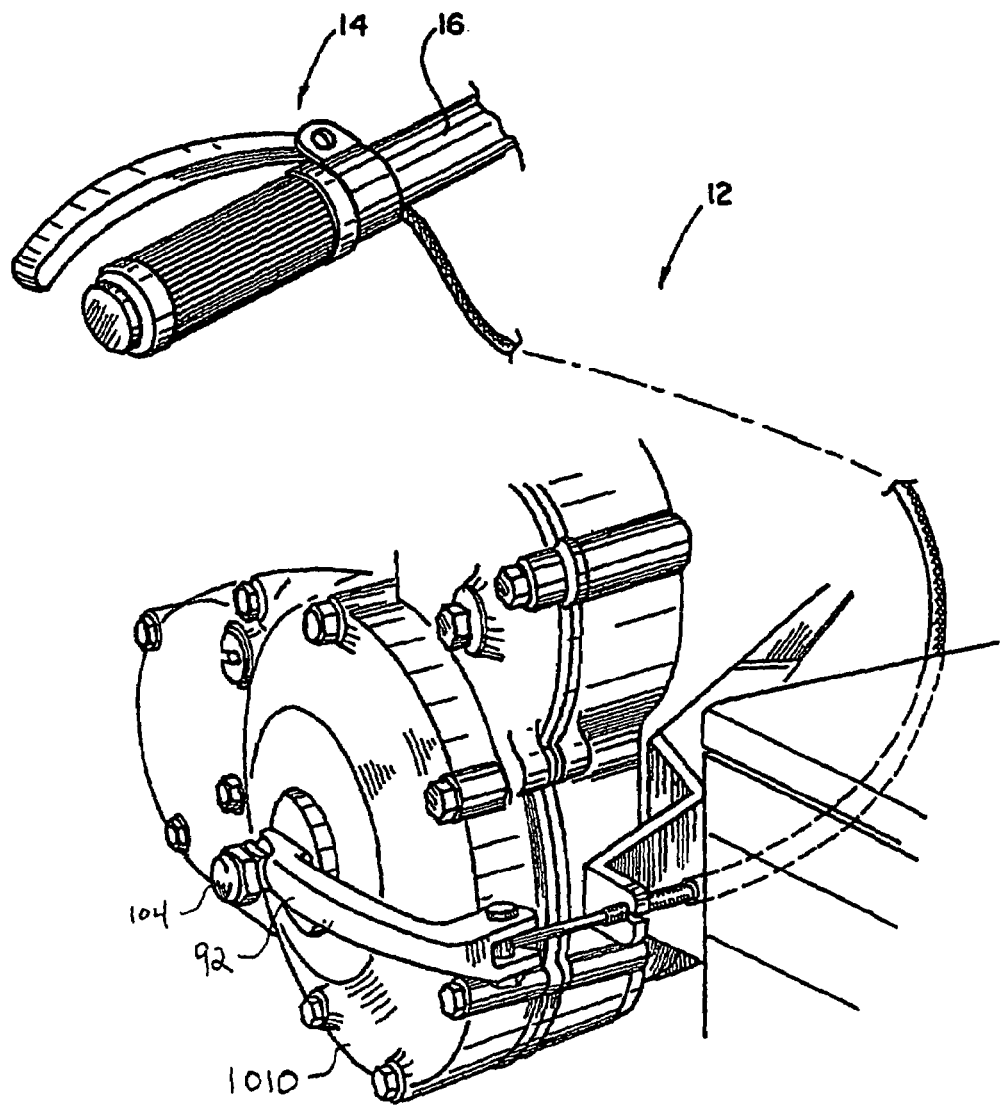
F I G. 6

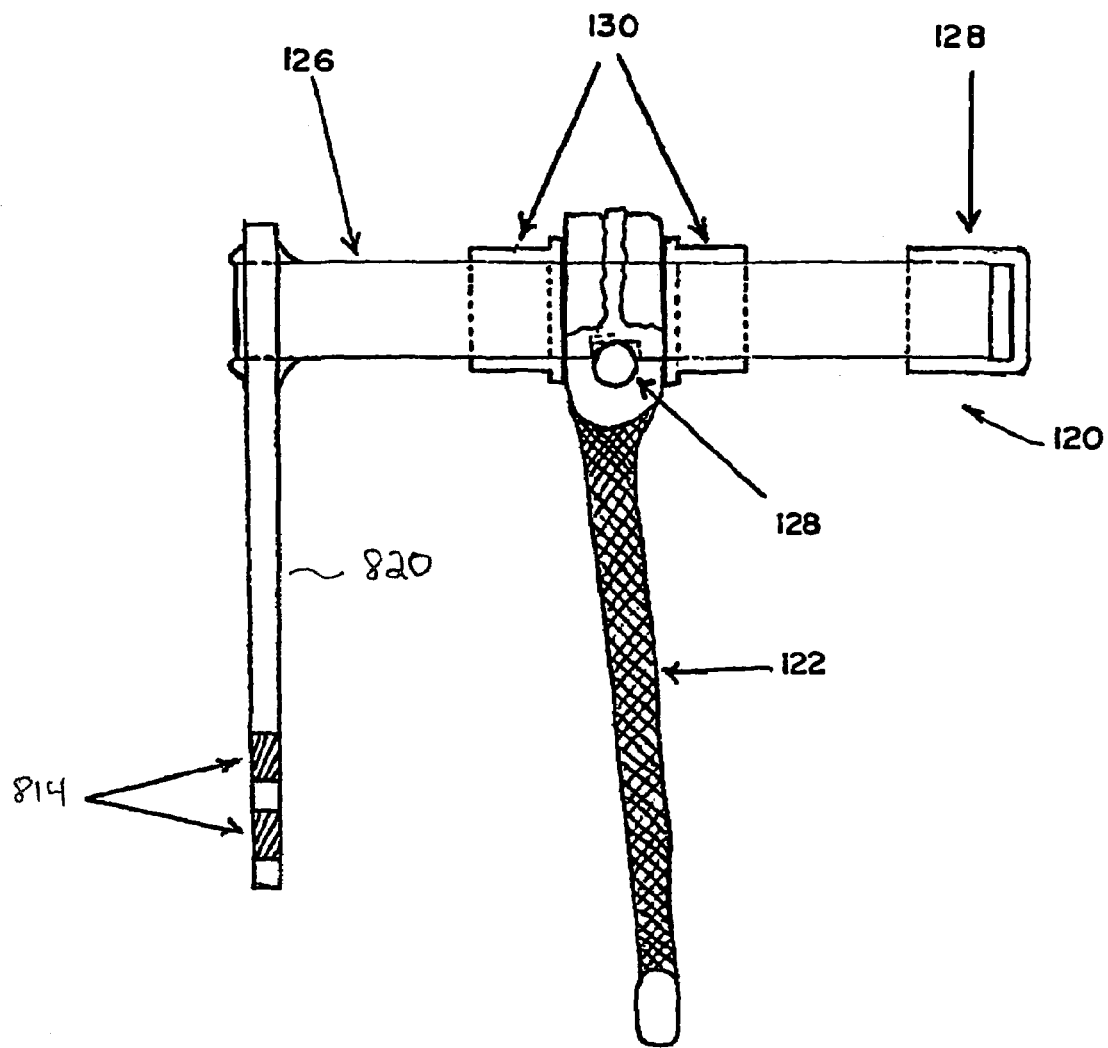
F I G. 8

MOTORCYCLE TRANSMISSION SHIFTING MECHANISM

CROSS REFERENCE TO RELATED APPLICATION

This application is based on and claims priority to U.S. Provisional Application No. 60/397,390 filed with the U.S. Patent and Trademark Office on Jul. 20, 2002 and fully incorporated herein by reference.

BACKGROUND OF THE INVENTION

1. Field of the Invention

The invention relates to a transmission assembly for motorcycles and more particularly, to a foot operated gearshift/hand-operated clutch release lever unit.

2. Description of the Prior Art

Evolution of a transmission assembly for motorcycles is well documented. In the beginning, the motorcycle enthusiasts and designers were eager to emulate automobile features arguing that a radical departure therefrom can adversely affect the popularity and, thus, future of the motorcycle industry. Hence, many of motorcycle brands were provided with a hand-operated gearshift/foot-operated clutch assembly so familiar to many generations of car drivers.

Gradually, technological developments leading to increased speeds, greater masses and grown popularity of motorcycles compelled the motorcycle industry to reevaluate its stance regarding many technological assemblies including clutch actuators and gear shifting mechanisms. Modem motorcycle designs overwhelmingly feature a handlebar-mounted clutch and foot-operated gear shifter configuration.

However, similar to many old car designs, old motorcycle designs have a great appeal to a very substantial contingent of motorcyclists. Some of the pioneer motorcycle manufactures, such as Harley-Davidson Motor Co., constantly change their original designs, others, like Indian Motor. Co., do not exist any more, but still have a legendary reputation making the originally manufactured motorcycles a rare and valuable item for a prodigious army of motorcyclists all over the world.

However, many original designs require numerous modifications to remain not only a museum-bound exhibit, but also to be a viable and well functioning utility means for transportation. Among the most desirable modifications, a conversion of a hand-operated gear shift/foot-operated clutch assembly into a foot-operated gear shift/hand-operated clutch unit has a universal appeal due to the safety and convenience reasons.

A need therefore exits for a reliable and simple configuration of a foot-operated gear shift/hand-operated clutch unit configured to be installed on modem and old motorcycle designs in a time- and labor-efficient manner.

SUMMARY OF THE INVENTION

This need is met by the inventive foot-operated gearshift/hand-operated clutch unit provided with a pedal and cam-actuated subassembly which are configured to cooperate with a transmission to shift through a succession of speed-ratio positions.

The inventive unit enables a motorcyclist to operate a motorcycle and shift through the gears with both hands on the handlebars with no need to remove one hand to manually shift through gears. The foot-operated gearshift allows for the shifting of the gears by imposing some pressure on either the toe or heal portions of the pedal depending on the desired gear. This pressure is transferred through the pedal to a pawl shaft and further to a cam subassembly by one of two pawls mounted on the pawl shaft. Displacement of the cam subassembly is transferred to a shift linkage moving at a predetermined amount and actuating a bell-crank assembly to eventually effectuate shifting of the gears.

The increased safety of the motorcycle equipped with the inventive unit enabling a motorcyclist to operate the vehicle with both hands constitutes one of the main advantages associated with the inventive unit. Still another advantage stemming from positioning of both hands on a handlebar is associated with the improved handling of the motorcycle.

The geometry of the pedal and cam plate assembly allows for a smooth shift through the gears while controlling the displacement of the pedal and cam assembly along respective predetermined paths.

In accordance with another aspect of the invention, the pedal and cam plate assembly is configured to have a pair of ratchet pawls cooperating with a cam plate so as to register the desired speed-ratio position. A system of shafts and pins, fixed to the motorcycle's frame and to the pedal assembly, respectively, and a resilient element biasing the pawls towards one another defines the desired sequence of the displacement of the paws relative to one another between successive speed-ratio positions.

A further aspect of the invention relates to the improved geometry of the clutch release lever assembly configured to selectively engage a gear train in response to actuation of a hand-operated clutch lever mounted on the handlebar of the motorcycle.

It is therefore the object of the invention to provide a new and improved semi-automatic gearshift assembly for motorcycles wherein actuation of a foot pedal defines progressive shifting through multiple gear ratio positions.

Another object of the invention is to provide a semi-automatic foot-operated gearshift assembly configured to have a few easily attachable parts;

A further object of the invention is to provide a hand-operated clutch release lever assembly characterized by a simple and effectively operating configuration; and Still a further object of the invention is to provide a kit including a foot-operated gearshift/hand-operated clutch unit configured to retrofit old and modem designs of motorcycles equipped with a hand-operated gearshift assembly.

BRIEF DESCRIPTION OF THE DRAWINGS

The above and other objects, features and advantages will become more readily apparent from the following specific description accompanied by a set of drawings in which:

FIG. 1 is an exploded side-front view of a foot-operated gearshift assembly as seen from outside;

FIG. 2 is an isometric rear view of a partially assembled gearshift assembly of FIG. 1;

FIG. 3 is an isometric rear view of the fully assembled gearshift assembly of FIG. 1;

FIG. 6 is an isometric view of a hand-operated clutch release lever assembly;

FIG. 8 is a diagrammatic view of a crankshaft assembly transmitting a force generated by the foot-operated gearshift assembly to a gear train;

SPECIFIC DESCRIPTION

Figure 4:
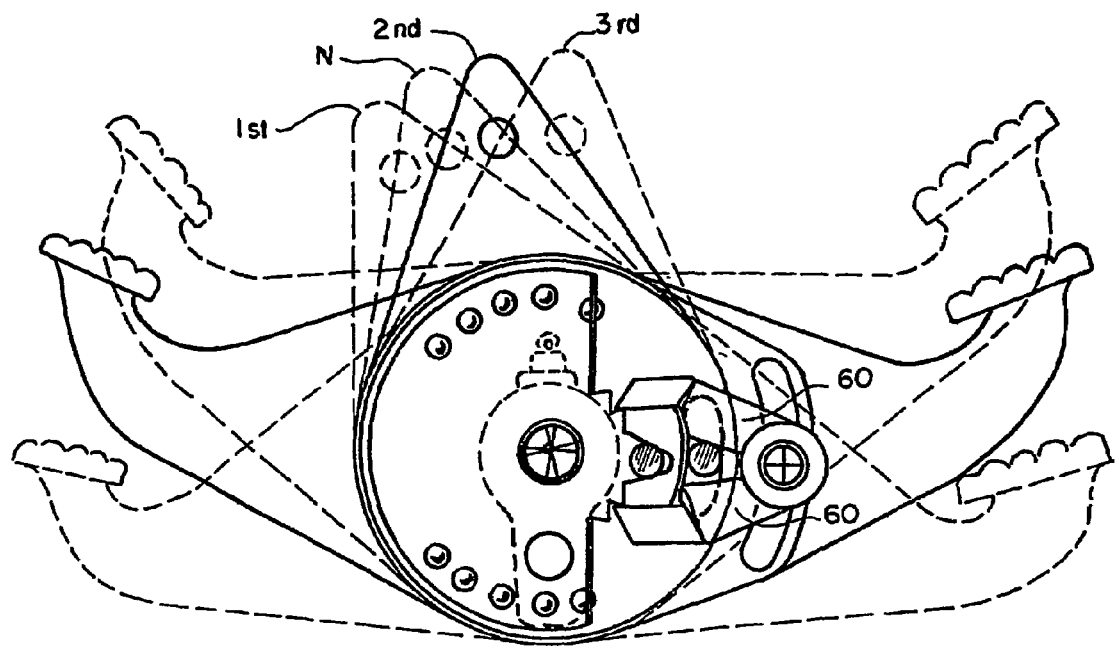
FIG. 4 is a diagrammatic view of multiple angular positions of the foot-operated gearshift assembly corresponding to fully established speed-ratio positions.
Figure 5:
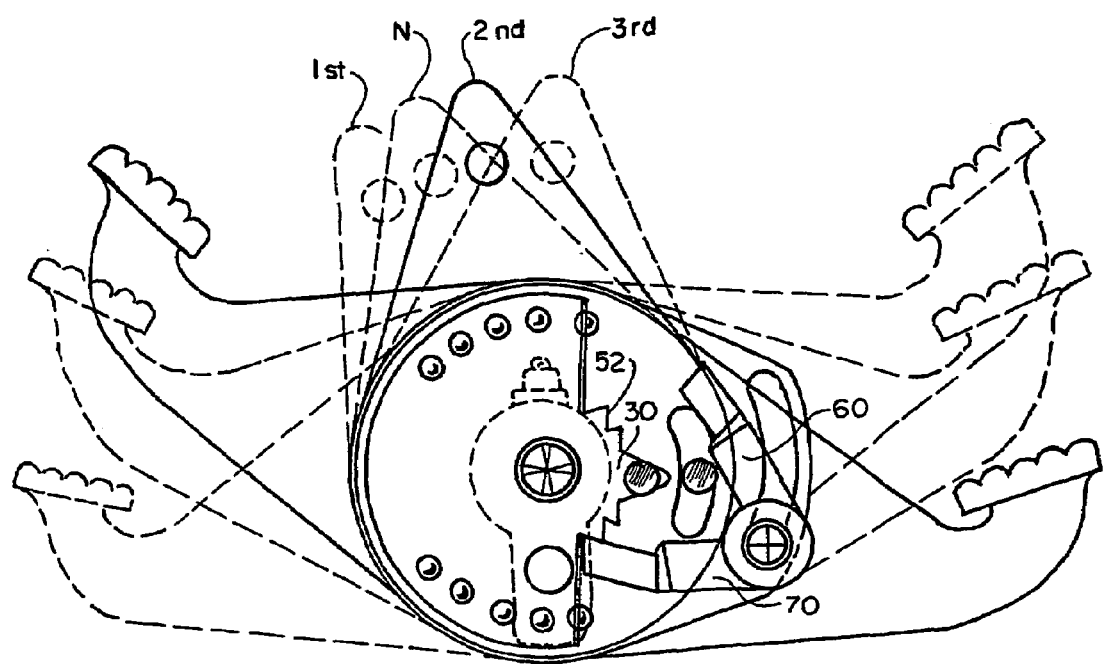
FIG. 5 illustrates the foot-operated gearshift assembly positioned between fully established speed-ratio positions during shifting through gears.
Figure 7:
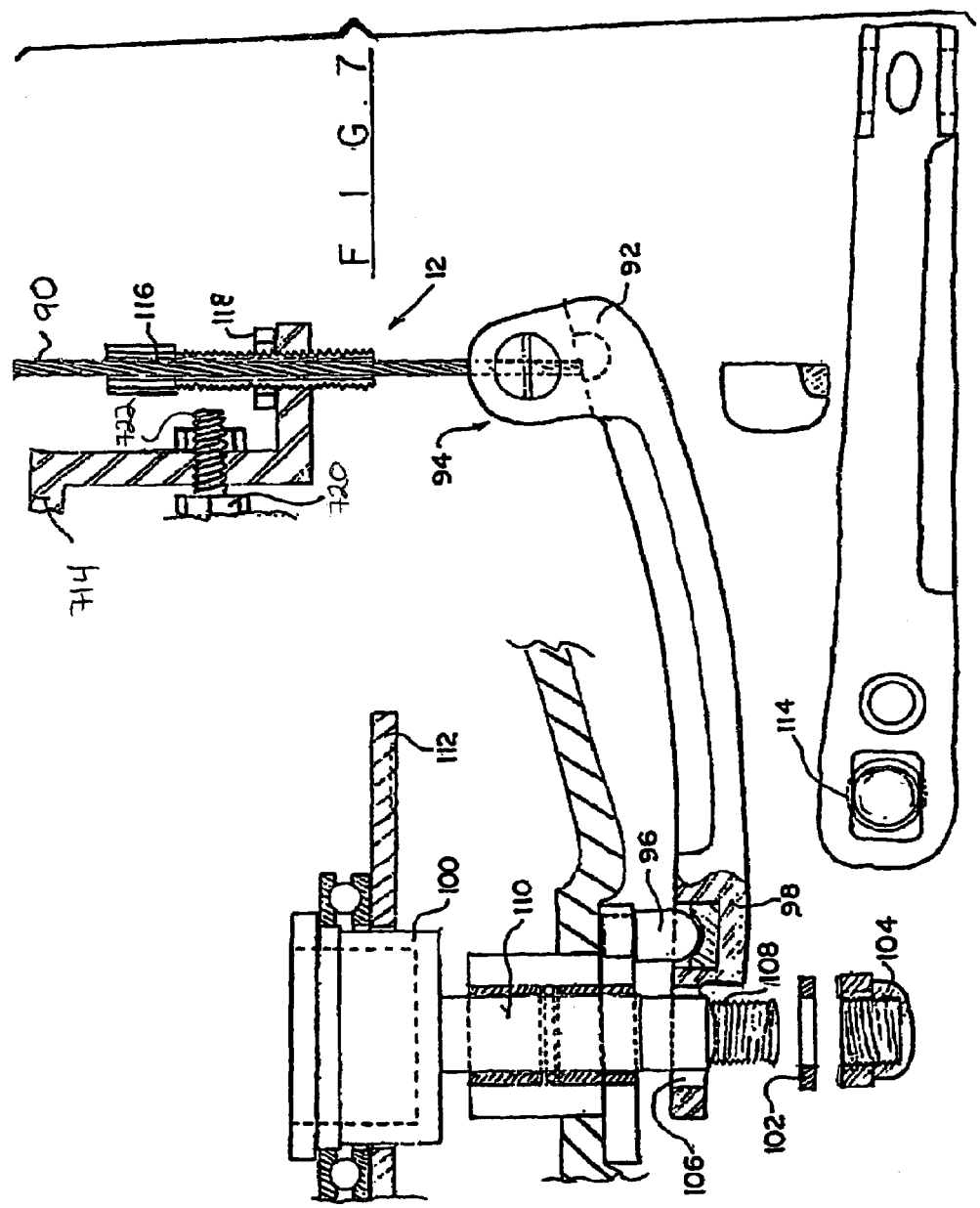
FIG. 7 is a cross-sectional view of the clutch release assembly.

Referring to figures, FIGS. 1-5 illustrate details of a foot-operated gearshift assembly 10, and FIGS. 6, 7 show details of a hand-operated clutch release assembly 12. Functioning in combination, the assemblies of FIGS. 1-7 allow a motorcyclist to shift through gears by initially depressing a clutch lever 14 located on a handlebar 16 to disengage intermeshed gears and subsequently shift through the gears by means of a pedal 18. Having established the desired speed-ratio position of the gears while holding both hands on the handlebar 16, the clutch lever 14 is released allowing the motorcycle to cruise at the desired speed.

Disengagement of the gears allows for pivoting the pedal 18 about an axis A-A in response to a pressure imposed by the foot of the motorcyclist. While the design of the pedal does not have to be of any specific shape and form, in the context of old brands, such as Indian Motorcycle, it is preferred to leave the original design intact. Following the accustomed pattern, pressing upon a toe portion 20 of the pedal 18 brings the motorcycle into first gear, as diagrammatically shown in FIGS. 6 and 7. Pressing the heel portion 22 of the pedal 18 every time when it is desired to switch to a subsequent higher gear does further upshifting. Configuration of a gear train and, thus, the direction of the pedal displacement can be changed to meet local requirements.

The pedal 18 is centered on a main pivot pin 24 extending through the rest of the foot-operated assembly 10 to be detachably and rotatably mounted to the frame of the motorcycle by its inner end while the outer end is rotatably fixed to the pedal by a castle nut 26. In addition to the pedal 18, a cam sub-assembly 36 coupled to the pedal and initially rotatable therewith in unison in response to the downward pressure applied to the latter, and a stationary detent plate 32, complete the foot-operated gearshift assembly 10. Mounting of the detent plate can be realized by a variety of means including, for example, a center retention bushing extending into the frame 500 (FIG. 9) of the motorcycle and a retention bolt securing the detent plate from any rotation (not shown). Alternatively, the detent plate can be welded to or cast into the frame. As is seen in FIGS. 1-3, a combination of the pedal and cam sub-assembly pivotal parts and the stationary detent plate represents a simple, readily attachable structure assembled in a relatively small housing.

In operation, angular displacement of the pedal 18 relative to the stationary detent plate 32 is translated into initial rotation of the cam assembly 36 by one of two pawl arms 60, 70 (FIGS. 2, 4 and) as will be explained below. The cam assembly includes a cam plate 28 and a cam 30 (FIG. 1) machined with two groups of notches 52 centered about an axis B-B of the cam sub-assembly 36 and cut at an angle that can vary depending on a particular shift pattern and gear configuration. The components of the cam-subassembly can be cast as a unitary body, detachably connected to one another by a variety fasteners, such as pins, screws or bolts, which may extend through holes 40 formed on both the cam and cam plate, or welded together. As a result of angular displacement of the cam sub-assembly 36 at a predetermined angle, the gears will be shifted through a succession of speed-ratio positions. Angular displacement of the pedal 18 and the cam subassembly 36 is transferred to the transmission a shift linkage 34 rigidly connecting the foot-operated gearshift assembly 10 and a transmission bell-crank assembly 120, as will be explained below (FIG. 8).

Structurally, the shift linkage 34 includes an elongated body having a connecting pin 46 which is sized and shaped to extend through an opening 48 of a cam plate 28 to be detachably connected to the latter by a nut unit 44. The linkage 34 can be configured to have a plurality of detachable parts displaceable relative to one another to accommodate geometrical variations of different motorcycle designs or to have a single size specifically manufactured for a particular brand and model.

The foot-operated gearshift assembly 10 has a simple structure including few parts and is precise in operation due to its geometry and mutual position of the displaceable pedal and cam subassembly relative to the stationary detent plate 32. Shifting smoothly through the successive speed-ratio positions requires that the pedal 18 be returned to its initial or rest position immediately upon releasing the pressure imposed by the motorcyclist upon the toe 20 or heel 22 pedal portions. The precision with which the pedal 18 returns to the initial position wherein the latter extends substantially parallel to the ground is determined by a combination of a pawl shaft 62, a two-arm pawl 60, 70 and a pawl upset pin 58 pressed through the detent plate 32. The pawl can have various configurations, such as a one-piece body having two resiliently biased arms. Alternatively, each of the arms can be formed as a separate unit (FIGS. 2 and 4-5) having an undercut portion 65, which is configured with an engaging surface extending complementary to the notches 52 of the cam 30.

In particular, the pawl shaft 62 is configured to receive pawl arms 60 mounted so that when the pedal 18 pivots about the axis A-A, only one of the pawl arms 60 moves with the pedal, while the other pawl arm 70 is lifted of the cam 30 by the pawl upset pin 58 overcoming a spring force of pawl return spring 64 (FIG. 2). The spring may have a variety of configurations including a circular or a fork-like, as is shown in FIG. 2 and having its ends coupled to the arms 60, 70 in a variety of implementations including, for example, engagement with the holes formed on the arms (not shown). Accordingly, the pawl 70 urging against the notch 52 transmits the pressure imposed upon the pedal and actuates the cam subassembly 36 to move synchronously with the pedal 18 at a predetermined angular distance. As a result, the shift linkage 34 is linearly displaced to actuate the transmission bell-crank assembly 120 located in the bell-crank housing 510 (FIG. 9) through rotation of bell-crank arm 820. While the cam subassembly 36 moves in response to the pressure applied to the pedal 18, a plurality of detent balls 72, each of which is biased by a respective spring 74 toward a detent 76 on the detent plate 32, is compressed until the detents and detent balls are aligned. A distance between the detents and their pattern correspond to the transmission detents in the transmission or gear location.

Detent balls 72 received in the detents of the detent plate 32 are so spring-loaded that the cam subassembly can be retained in an angular position without any additional means including intermeshed gears. Moreover, a number of the balls as well as a spring rate can be selected depending on the amount of force required to hold the cam subassembly in the desired angular position.

In the aligned position corresponding to the desired speed-ratio position, the detent balls 72 are forced into the respective detents 76. After the desired speed-ratio position has been established, the pressure upon the pedal is released to allow it to return to its rest position independently from the cam assembly 36, which remains in the displaced position shown in FIG. 5. Displacement of the cam subassembly 36 in response to the pressure applied to the pedal 18 is a function of the size, shape, depth and angle of the notches 52 cut into the cam 30.

Independent displacement of the pedal relative to the cam sub-assembly back to its rest position is a result of two structural configurations. First, a pedal returning spring 66 (FIG. 3), coupled to a spring bolt 78 which, in turn, is attached to the inner side of the detention plate 32, is loaded against the pawl upset pin 58 and pawl shaft 62 so as to bias the pedal 18 with the pawl shaft 62 towards the rest position of the pedal. The pedal spring 66 is configured to yield to the pressure imposed upon the pedal 18, but strong enough to generate a spring force transmitted by one of its arms to the pawl shaft 62 so that the pedal and the pawl shaft return to the rest position while the other arm of the pedal spring is supported by the pawl upset pin 58. Structurally, the pedal return spring can be a fork-like, as shown in the drawings, or a simple coil spring having one end attached to the frame of the motorcycle or to the detent plate 32 and the other one to the pawl shaft 62.

Second, the cam subassembly is mounted on the main pivot pin 24 by means of a thrust bearing 38 and a centering bushing (not shown) allowing the cam subassembly to idle while the main pivot pin rotates with the pedal to the rest position of the latter. As the pawl shaft 62 moves toward the rest position, the pawl 60 is displaced toward the cam 30 under the force of a pawl return spring 64 (FIG. 2) braced against the pawl upset pin 58 and configured to bias the pawls 60 and 70 toward one another. At the end of the angular displacement, the pawl 60 engages a respective one of the notches 52 of the cam 30. Accordingly, the pawls 60, 70 are pressed against the teeth of the cam 30 by a force generated by the pawl return spring 64 and thus preventing the cam 30 from any further rotation in the desired speed-ratio position as long as the pedal is in the rest position.

If it is desirable to establish a new speed-ratio position, the sequence of operations is repeated by first generating a downward pressure upon the toe 20 or heel 22 portions of the pedal and forcing the latter to pivot around the main pivot pin 24. Downward pressure is transferred through the pedal to the pawl shaft 62 causing one of the pawls 60, 70 to displace the cam subassembly 36 to a new position while the other pawl is lifted of the cam by the pawl upset pin 58. Upon releasing the pressure, as the pedal 18 and the pawl shaft 62 return to the rest position, the lifted pawl engages a respective cam lobe of the cam 30 thus ratcheting the latter to be in the desired gear position. To establish a subsequent speed-ratio position, as shown in FIGS. 6 and 7, the pedal is actuated again upon applying a downward pressure.

The precision of the above-disclosed sequence of gear shifting operations becomes possible mainly due to dual functions performed by each of the pawl shaft 62 and the pawl upset pin 58. The pawl upset pin 58 functions first as a barrier for one of the pawls 60, 70 while the other pawl moves along with the pawl shaft 62 and the pedal 18. Secondly, the stationary upset pin 58 centers the pedal 18 in the rest position thereof by providing the necessary support for the pedal resilient spring 78, which is configured to bias the pawl shaft 62 and the pedal 18 towards the rest position of the latter.

The functional duality of the pawl shaft, first of all, includes the support for the pawls 60 and 70 as well as for the pawl returning spring 64. Secondly, the pawl shaft 62 acts as a part of a stop assembly, which also includes a pedal stop hole 78 formed in the detent plate 32 and configured to stop the pawl shaft 62 and, thus, the pedal 18 from unrestricted angular displacement.

In accordance with another aspect of the invention, the hand-operated clutch release assembly 12 operates in response to a tensile force generated by the squeezed release lever 14 and applied to a cable 90 (FIG. 7) attached thereto by one of its ends. The other end of the cable 90 is detachably retained into a release lever 92 by a cable retention assembly. Different configurations of the cable retention assembly can be utilized within the scope of this invention including, for example, Indian Motorcycle. As a result of the tension force applied by the cable 90, the opposite end 98 of the release lever 92 pivots on a pivot pin 96 and subsequently pulls on piston 100. To effectively transmit the tensile force generated by the cable 90 to the piston 100, the end 98 of the lever 92 has an opening 106 sized to allow a threaded proximal end 108 of a shaft 110, which is coupled to the piston 100, to go through the opening 106 and be secured by a washer 102 and a nut cap 104. The shaft 110 is inserted through an opening in an outer primary case cover 1010 of the clutch. Due to the rigid connection between the lever 92 and the shaft 110, the latter transfers the tensile force through a throw out bearing to a clutch pressure plate 112 upsetting the clutch pressure plate 112 by overcoming the pressure of the clutch spring pack 520 (FIG. 10) and releasing the clutch.

When the tension is released from the cable 90, the pressure of the clutch spring pack reverses the lever action by pulling the piston 100 back into its idle position subsequently reengaging the clutch. The piston 100 is restrained from rotation by flats 114 formed on the proximal end 108 of the shaft 110 engaging the complementarily extending surfaces inside the opening 106 of the release lever 92. Overall, the piston 100 is not subject to a great torque due to the throw out bearing preventing rotation of the piston in a clutch-engaged position.

The cable 90 is retained by means of a cable bracket 714, mounted to the frame 500, and can be adjusted by a cable adjuster 116 with an adjuster nut 118. Cable adjuster bracket support bolt 722 and a jam nut 720 are adjustable to remove any flex in the cable adjuster bracket 714 when tension is applied.

Turning to FIG. 8, the transmission bell-crank assembly 120 is configured to shift gears in response to the linear motion of the shift linkage 34 (FIG. 1) and disengaging the clutch by the clutch release assembly, as discussed in reference to FIGS. 6 and 7. Linear displacement of the shift linkage 34, attached to shift linkage mount hole 814 of the bell-crank assembly 120, is translated into rotational motion of a shaft 126 causing the a shift fork input lever 122 to manipulate the gears. The fork input lever 122 is mounted on the shaft 126 midway between the opposite ends thereof by means of hat bushings 130 and is rotationally fixed to the shaft by a wedge pin 126. The whole assembly is mounted in a housing by means of an end cap bushing 128 and is centered by hat bushings 130.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

Figure 9:
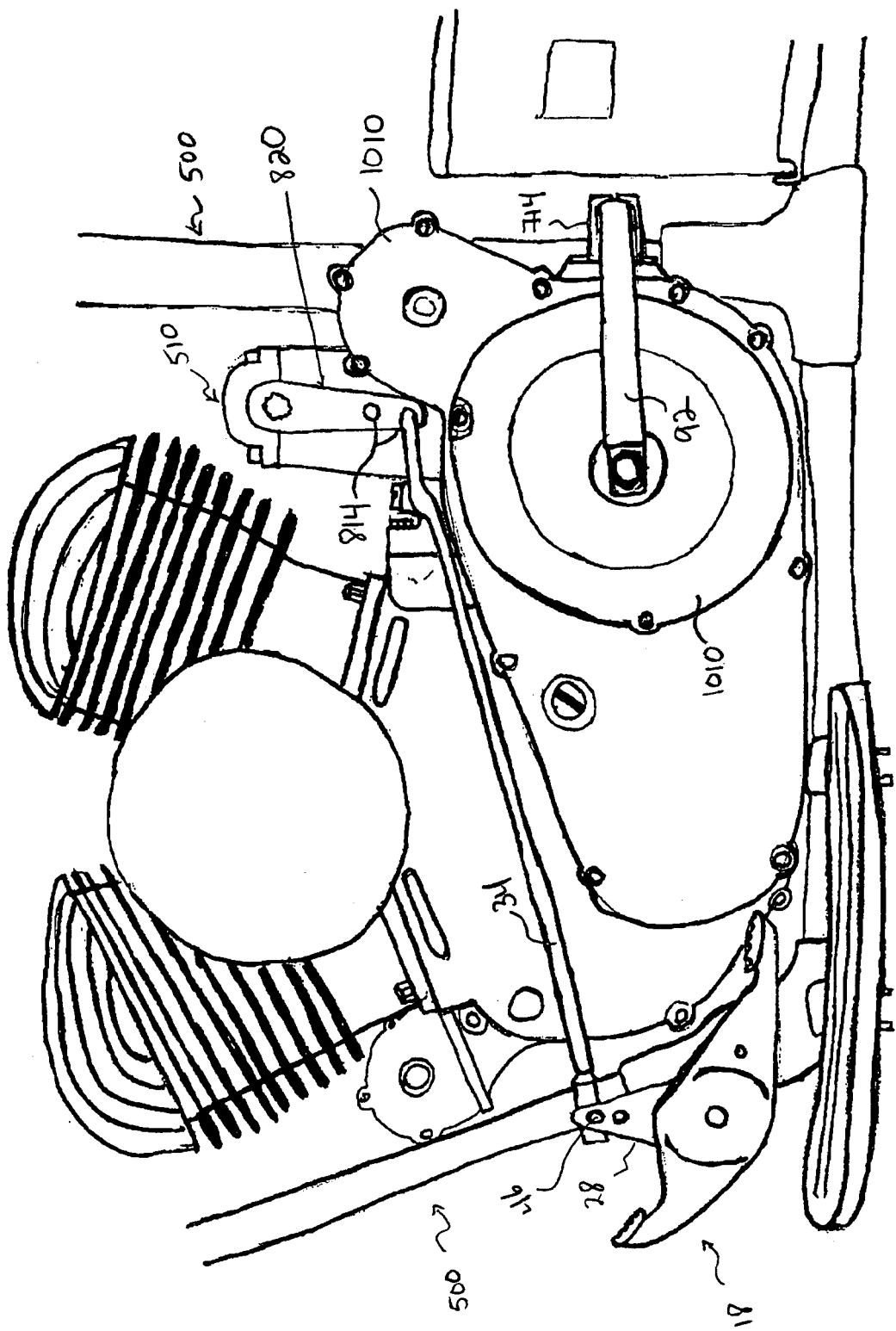
FIG. 9 is a diagram illustrating the present invention connected to an existing motorcycle.

FIG. 9 is a diagram illustrating the present invention connected to an existing motorcycle. Shown in FIG. 9 are motorcycle frame 500. The existing motor and transmission are illustrated therein. Pedal 18, cam plate 28 connecting pin 46, and shift linkage 34 are shown. Bell-crank housing 510 is shown with bell-crank arm 820 and shift linkage mount holes 814. The outer primary case cover 1010 is shown covering the clutch release assembly. Release lever 92 and cable bracket 714 are also shown.

Figure 10:
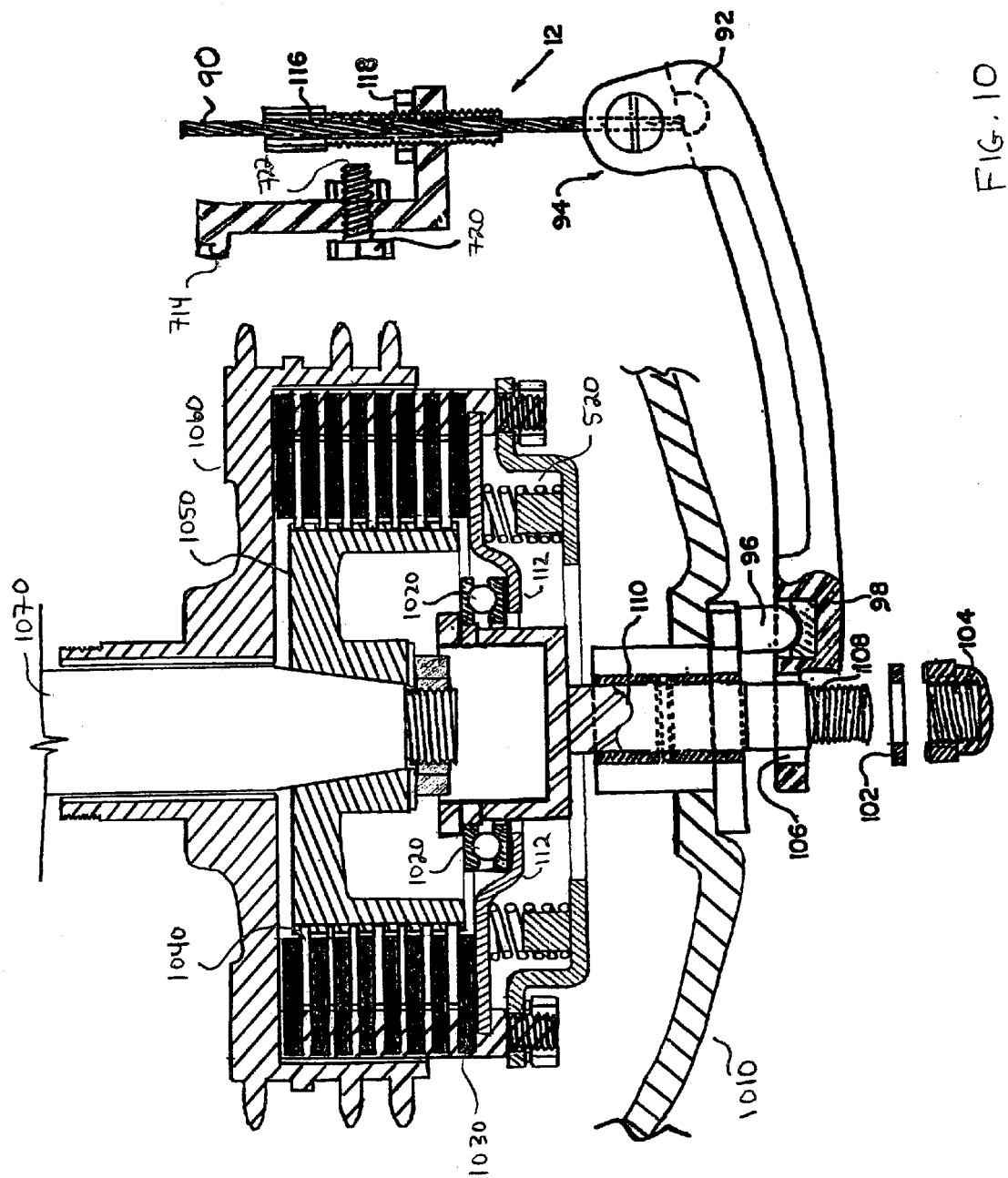
FIG. 10 is an enhanced cross-sectional view of the clutch release assembly.

FIG. 10 is an enhanced cross-sectional view of the clutch release assembly. Outer primary case cover 1010 is shown, through which shaft 110 extends. Clutch pressure plate 112 is shown abutting the clutch spring packs 520. Also shown are metal disk 1040, clutch disk 1030, clutch hub 1050 and clutch basket 1060. Transmission input shaft 1070 connects the clutch release assembly with the transmission. Ball bearings 1020 are also shown.

What is claimed is:

1. A foot-operated gearshift/hand-operated clutch release unit for a motorcycle comprising:
   a pedal pivotal about a pedal axis between a rest and loaded position in response to an external pressure;
   a cam sub-assembly coupled to the pedal and selectively pivotal about the axis to a plurality of angular positions each corresponding to a respective speed-ratio position of a transmission, comprising:
      a cam and cam plate coupled together to synchronously pivot between the plurality of angular positions, the cam being configured to have a plurality of teeth variably shaped and dimensioned to correspond to the transmission;
   a motion-translating link located between the pedal and the cam sub-assembly and configured to displace and retain the cam-subassembly in a respective one of the angular positions while allowing the pedal to return to the rest position thereof; and
   a stationary detent plate mounted to a frame of the motorcycle and juxtaposed with an inner side of the cam plate of the cam subassembly.

2. The unit of claim 1, wherein the cam and cam plate are welded together, cast as a unitary body or detachably coupled to one another to pivot in unison with the pedal in response to the application of the external pressure.

3. The unit of claim 2, wherein the motion-translating link is configured to have a ratchet mechanism coupled to the pedal for pivoting therewith in response to the external pressure and operatively and selectively engaging the teeth of the cam to actuate displacement of the cam and cam plate between the plurality of the angular positions.

4. The unit of claim 3, wherein the ratchet mechanism includes a two-arm pawl resiliently biased toward one another and displaceable angularly relative to one another about a pawl axis, which extends parallel to the pedal axis, one of the pawl arms engaging a respective tooth of the cam so that the cam sub-assembly pivots to a desired one of the plurality of angular positions as the pedal pivots to the loaded position.

5. The unit of claim 4, further comprising a pawl shaft coupled to an inner side of the pedal to move therewith and extending parallel to and spaced from the pedal axis, the two-arm pawl being mounted on the pawl shaft so that when the pedal and the pawl shaft are displaced in response to the external pressure, one of the arms of the pawl engages a respective tooth of the plurality of teeth of the cam to transfer the angular displacement of the pedal to angular motion of the cam subassembly to a desired angular position.

6. The unit of claim 5, wherein the stationary detent plate is provided with a pawl upset pin extending through the cam plate and having a free end engaged between the two arms of the pawl so that when the pawl shaft is displaced with the pedal from the rest position thereof, the other arm of the pawl is urged against the pawl upset pin and prevented from further displacement.

7. The unit of claim 6, wherein the cam plate has a pawl pin channel shaped and configured to receive the free end of a pawl upset pin and to limit the angular displacement of the cam subassembly relative to the pedal, the unit further comprising a pawl resilient element cooperating with the two-arm pawl and biasing the arms towards one another as the pedal and the pawl shaft return to the rest position of the pedal upon releasing the external pressure.

8. The unit of claim 7, further comprising a main pivot pin extending along the axis of the pedal and through the cam subassembly and a detent plate to be rotatably mounted to a frame of the motorcycle and fixed to the pedal by opposite ends thereof, the cam subassembly being mounted on the main pivot pin to rotate independently therefrom in response to a force applied by one of the arms of the pawl.

9. The unit of claim 7, wherein the pawl upset pin extends between the pedal axis and the pawl shaft and has an inner end opposite to a free end thereof extending through the stationary detent plate, the unit further includes a pedal returning resilient element mounted on an inner side of the detent element and loaded against the inner end of the pawl upset pin and a distal end of the of the pawl shaft so that the pedal and pawl shaft return to the rest position of the pedal upon releasing the external pressure.

10. The unit of claim 9, wherein the pedal returning resilient element is a spring configured to straddle the pawl shaft and the pawl-upset pin so that when the pedal is displaced, the spring and the pawl-upset pin in combination center the pedal in the rest position thereof upon releasing the external pressure.

11. The unit of claim 7, wherein the pawl resilient element includes a spring configured to have two arms straddling the pawl upset pin and mounted on the pawl shaft to exert a spring force urging the arms of the pawl against the teeth of the cam when the pedal returns to the rest position thereof.

12. The unit of claim 6, wherein the stationary detent plate is provided with a pawl shaft channel traversed by and cooperating with the pawl shaft to limit angular displacement of the pedal.

13. The unit of claim 6, wherein the inner side of the cam plate has a series of spring loaded detent balls extending towards the detent plate, which has a plurality of detents spaced apart in a pattern identical to a pattern defined by the series of spring loaded detent balls, the detent balls being retracted as the cam subassembly displaces relative to the detent plate to an aligned position, in which the detent balls are biased towards and received by respective detents to retain the cam subassembly in the desired angular position as the pedal return in the rest position.

14. The unit of claim 1, further comprising a shift linkage having one end detachably coupled to the cam-subassembly and an opposite end detachably coupled to a bell-crank assembly of the transmission, the shift linkage being so attached to the cam-subassembly that as the cam subassembly moves angularly the linkage is displaceable linearly to transfer the angular displacement of the cam subassembly to rotational motion of the crank-bell assembly.

15. The unit of claim 14, further comprising a hand-operated lever mounted on a handlebar of the motorcycle and actuating a clutch release mechanism to allow the shift linkage to actuate the crank-bell assembly.

16. The unit of claim 15, wherein the clutch release mechanism includes a tension cable having one end thereof attached to the hand-operated lever and an apposite end attached to a release lever pivotal between rest and loaded positions upon actuating the hand-operated lever and generating a force sufficient to release a clutch in the loaded position.

17. The init of claim 16, wherein the clutch release mechanism further includes a piston configured to transfer the force generated by the release lever to a clutch pressure plate, whereas the force is sufficient to overcome a clutch spring pack to release the clutch.

18. The unit of claim 17, wherein the release lever has one opposite ends thereof attached to the tension cable and an opposite end provided with an opening configured to receive a shaft extending from and coupled with the piston, the unit further comprising a pin extending parallel to the shaft and having an end surface configured to allow the release lever to pivot thereabout to the loaded position of release lever while displacing the shaft and the piston to release the clutch.

19. The unit of claim 18, wherein the opening is configured to prevent the shaft from rotation, the unit further comprising an adjustable cable tensioning mechanism.

20. The unit of claim 13, wherein a number of the spring-loaded detent balls varies depending a force required to prevent displacement of the cam-subassembly from the aligned position upon displacing the pedal in the rest position thereof.

* * * * *